(12) United States Patent
Lai

(10) Patent No.: US 11,979,190 B2
(45) Date of Patent: May 7, 2024

(54) PASSIVE OPTICAL NETWORK

(71) Applicant: Airoha Technology (Suzhou) Limited, Suzhou (CN)

(72) Inventor: Hai-Sheng Lai, Suzhou (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 62 days.

(21) Appl. No.: 17/831,704

(22) Filed: Jun. 3, 2022

(65) Prior Publication Data

US 2023/0179303 A1 Jun. 8, 2023

(30) Foreign Application Priority Data

Nov. 19, 2021 (TW) .................................. 110143082

(51) Int. Cl.
*H04B 10/27* (2013.01)

(52) U.S. Cl.
CPC .................................. *H04B 10/27* (2013.01)

(58) Field of Classification Search
CPC ............................ H04B 10/27; H04Q 11/0067
USPC ............................................................ 398/58
See application file for complete search history.

(56) References Cited

U.S. PATENT DOCUMENTS

| | | | | |
|---|---|---|---|---|
| 7,630,637 B2 * | 12/2009 | Mizutani | ............... | H04J 3/1694 398/58 |
| 8,855,493 B2 * | 10/2014 | Elhage | .................. | H04L 43/50 398/72 |
| 2007/0264017 A1 * | 11/2007 | Mizutani | ............... | H04L 12/185 398/72 |
| 2010/0067910 A1 * | 3/2010 | Mizutani | ............... | H04L 12/185 398/67 |
| 2013/0156426 A1 * | 6/2013 | Kim | .................... | H04Q 11/0067 398/45 |
| 2014/0099100 A1 * | 4/2014 | Elhage | .................... | H04L 43/50 398/25 |
| 2015/0043908 A1 * | 2/2015 | Prause | .................. | H04B 10/27 398/34 |
| 2015/0373430 A1 * | 12/2015 | Kim | .................. | H04Q 11/0067 398/48 |
| 2016/0066073 A1 * | 3/2016 | Eddleston | .......... | H04Q 11/0067 398/25 |
| 2019/0273634 A1 * | 9/2019 | Peng | .................... | H04J 14/0227 |

FOREIGN PATENT DOCUMENTS

| | | | |
|---|---|---|---|
| CN | 101150363 A | * | 3/2008 |
| JP | 2016149609 A | * | 8/2016 |

* cited by examiner

*Primary Examiner* — Abbas H Alagheband
(74) *Attorney, Agent, or Firm* — BACON & THOMAS, PLLC

(57) ABSTRACT

An optical network unit (ONU) used in a passive optical network (PON) includes an optical fiber interface, a sniffer module and a frame format converting module. The optical fiber interface is configured to receive an XGPON Transmission Convergence (XGTC) frame. The sniffer module is configured to output a downstream unprocessed XGEM frame and an upstream unprocessed XGEM frame according to the XGTC frame. The frame format converting module is configured to convert the downstream unprocessed XGEM frame and the upstream unprocessed XGEM frame to respective Ethernet (ETH) frames.

11 Claims, 4 Drawing Sheets

PASSIVE OPTICAL NETWORK

CROSS REFERENCE TO RELATED APPLICATION

This application claims the benefits of the Taiwan Patent Application Serial Number 110143082, filed on Nov. 19, 2021, the subject matter of which is incorporated herein by reference.

BACKGROUND OF THE INVENTION

1. Field of the Invention

The present invention relates to a technical field of a passive optical network (PON), and is particularly applicable to an optical network unit (ONU) of the passive optical network.

2. Description of Related Art

Gigabit Passive Optical Network (GPON) Standard is a newly developed standard, which can provide subscribers with high speed data transmission service, typically involving internet, telephone or television broadcast. In order to ensure the correctness of data transmission, it needs to perform an analysis on transmitted data. Current analyzing means need relatively high time cost and capital cost. Therefore, there is a need to provide an improved optical network unit which can perform an analysis and debug on upstream data and downstream data with low cost.

SUMMARY OF THE INVENTION

In view of this, the present invention aims to provide an optical network unit having a special sniffer module, which can output a special sniffer datum according to a received XGTC header and datum, and transmit the sniffer datum to a personal computer or notebook computer via an Ethernet for further analysis.

According to the aforementioned aspect of the present invention, the present invention provides an optical network unit (ONU), applicable to a PON, the ONU including: an optical fiber interface, a sniffer module and a frame format converting module. The optical fiber interface is configured to receive an XGPON Transmission Convergence (XGTC) frame, wherein the XGTC frame includes an XGTC header and a plurality of downstream XGPON Encapsulation Method (XGEM) frames. An XGEM frame is also called a subframe when appropriate. The sniffer module is configured to output a downstream unprocessed XGEM frame and an upstream unprocessed XGEM frame according to the XGTC frame. The frame format converting module is configured to convert the downstream unprocessed XGEM frame and the upstream unprocessed XGEM frame respectively into a first Ethernet frame and a second Ethernet frame.

Optionally or preferably, the ONU includes: a filter configured to obtain a dedicated downstream XGEM frame which belongs to the ONU from the XGTC frame, wherein the frame format converting module is configured to convert the dedicated downstream XGEM frame into a third Ethernet frame, wherein the plurality of downstream XGEM frames include the dedicated downstream XGEM frame and a non-dedicated downstream XGEM frame which does not belong to the ONU.

Optionally or preferably, the sniffer module includes an upstream sniffer and a segmenter, the upstream sniffer configured to encapsulate a specific control datum into an Ethernet unprocessed frame, and the segmenter is configured to convert the Ethernet unprocessed frame into the upstream unprocessed XGEM frame, wherein the specific control datum is generated according to a control message in the XGTC frame.

Optionally or preferably, the sniffer module includes: a downstream sniffer configured to encapsulate datum of the XGTC header into the downstream unprocessed XGEM frame.

Optionally or preferably, the ONU further includes: a header analyzer configured to obtain datum of the XGTC header from the XGTC frame.

Optionally or preferably, the segmenter is configured to set a datum length of the upstream unprocessed XGEM frame to be equal to a datum length of the non-dedicated downstream XGEM frame.

Optionally or preferably, the XGTC frame includes an XGTC payload, and the XGTC payload includes the plurality of downstream XGEM frames, wherein a temporal sequence between the downstream unprocessed XGEM frame and the upstream unprocessed XGEM frame is the same as a temporal sequence between the XGTC header and the XGTC payload.

Optionally or preferably, the ONU further includes: a recording module configured to record the XGTC header in the downstream XGTC frame and the data of the downstream XGEM frames.

Optionally or preferably, the ONU further includes: an Ethernet interface configured to send the first Ethernet frame and the second Ethernet frame to a personal computer or a notebook computer.

Optionally or preferably, the personal computer or the notebook computer is installed with a plug-in program used to perform an analysis and debug on the first Ethernet frame and the second Ethernet frame.

According to another aspect of the present invention, the present invention provides an optical network unit (ONU) including: an optical fiber interface, a sniffer module, and a frame format converting module. The optical fiber interface is configured to receive a downstream frame, wherein the downstream frame comprises a header and a plurality of subframes. The sniffer module is configured to output a downstream unprocessed subframe and an upstream unprocessed subframe set according to the downstream frame. The frame format converting module is configured to convert the downstream unprocessed subframe and the upstream unprocessed subframe set respectively into a first Ethernet frame and a second Ethernet frame.

Optionally or preferably, the sniffer module further includes: a segmenter configured to output the upstream unprocessed subframe set according to a beginning marker of a first subframe of the subframes, the first subframe belonging to a first ONU other than the ONU.

Optionally or preferably, the segmenter is configured to output the upstream unprocessed subframe set at a receiving time point of the beginning marker.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

In the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, the method of the present invention, or a step or a mean therein may be implemented in any required and suitable way. For example, they may be implemented in a hardware or software. Except otherwise specified, a plurality of functional components, levels and means of the present invention may include a configuration of a processor, a controller, a functional unit, an electronic circuit, a logic program, a microprocessor, and so on, to operate or execute required functions. A dedicated hardware component and/or a programmable hardware component may be introduced and configured to operate in a required and suitable way.

Figure 1:
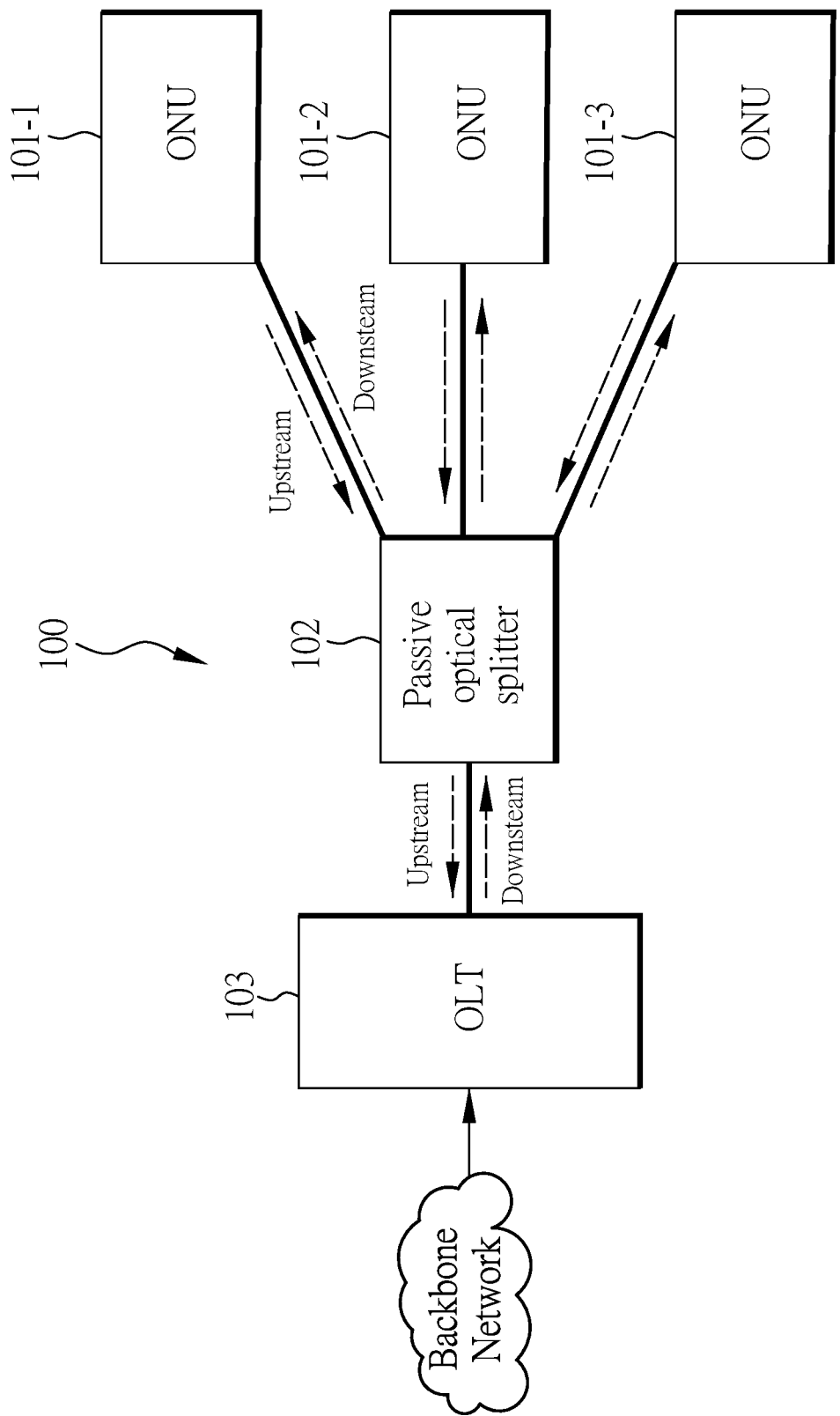
FIG. 1 shows a schematic diagram of a typical passive optical network.

FIG. 1 shows a schematic diagram of a typical passive optical network 100.

The passive optical network 100 includes a plurality of optical network units 101 (labeled as 101-1, 101-2, 101-3), a passive optical splitter 102 and an optical line terminal (OLT) 103. The optical network units 101-1, 101-2 and 101-3 are connected to the OLT 103 via the passive optical splitter 102. Downstream data are broadcasted from the OLT 103 to all of the ONUs 101, and each ONU 101 acquires its required data. The OLT 103 distributes different time intervals to the ONUs 101, and each ONU 101 transmits its own upstream data to the OLT 103 within its own time interval. The passive optical splitter 102 splits a single line into multiple lines. Moreover, the ONU 101 has to be activated when it is connected to the PON 100, and the ONU 101 then generates the upstream data to be provided to the OLT 103 according to a control message in the downstream data, wherein the control message may be a bandwidth (BW) map for example.

Since there may be a need to perform an analysis and debug on some data in the downstream data and the upstream data to ensure data correctness, some existing approaches suggest using and connecting a dedicated analyzing device to the ONU 101 to obtain and analyze the downstream data and the upstream data by the analyzing device. However, the analyzing device is very expensive, and requires much time to perform the analysis and debug, and thus many drawbacks remain in practical use.

Figure 2:
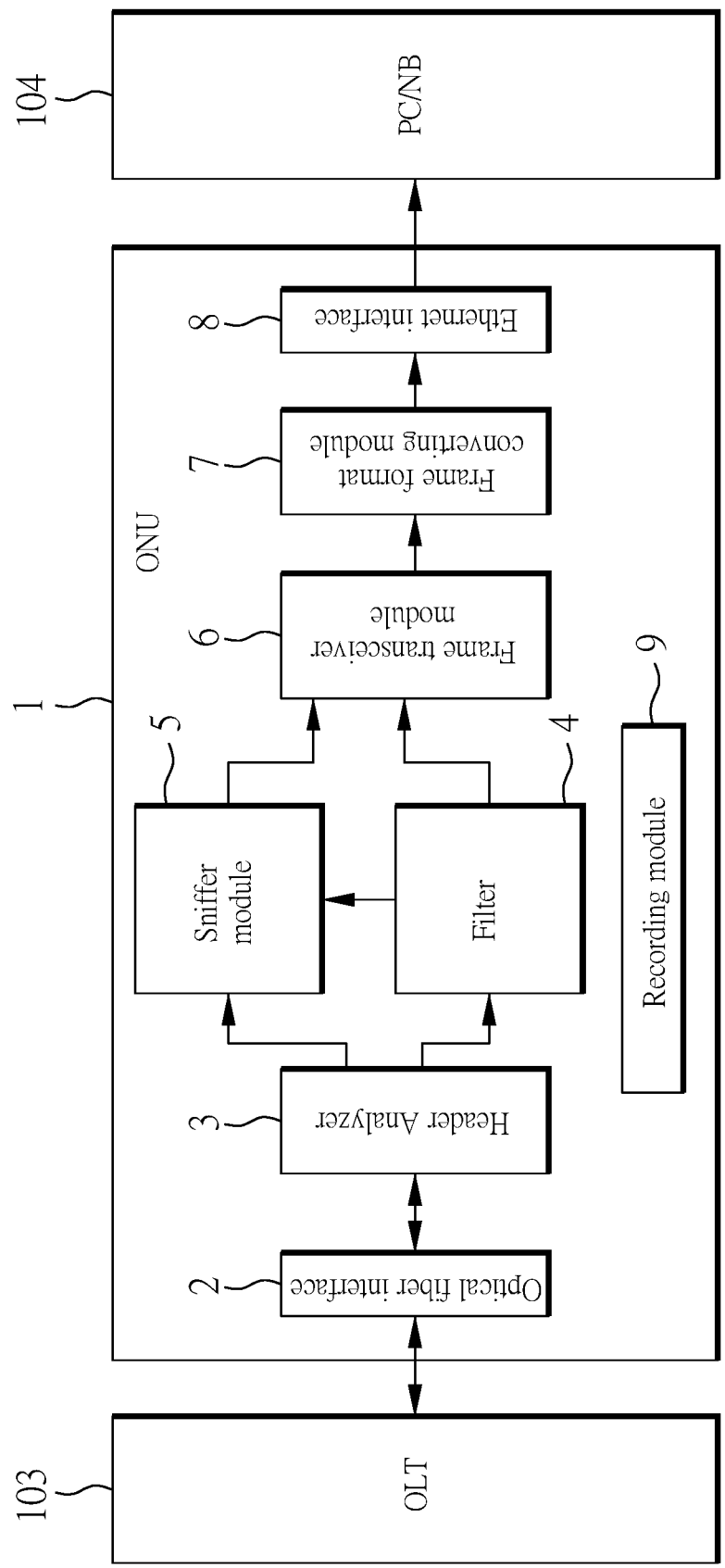
FIG. 2 shows a systemic block diagram of the ONU according to one embodiment of the present invention.

FIG. 2 shows a block diagram of an ONU 1 according to one embodiment of the present invention. The ONU 1 is applicable to the PON 100. In some embodiments, the PON 100 may be a gigabit-capable passive optical network (that is, GPON). In another embodiment, the PON 100 may be a ten (10)-gigabit-capable passive optical network (that is, XGPON).

As shown in FIG. 2, the ONU 1 includes an optical fiber interface 2, a header analyzer 3, a filter 4, a sniffer module 5, a frame transceiver module 6, a frame format converting module 7, an Ethernet interface 8 and a recording module 9. In one embodiment, the aforementioned elements may be connected in a way as shown in FIG. 2, but not limited thereto.

The optical fiber interface 2 is configured to receive downstream data from an OLT 103, or transmit upstream data to the OLT 103. The downstream data are carried by a transmission frame. In one embodiment, the transmission frame is an XGPON transmission convergence (XGTC) frame (also called a downstream frame when appropriate), which may include an XGTC header and an XGTC payload. For a downstream direction, the XGTC payload includes one or more XGPON encapsulation method (XGEM) frames (hereinafter, "downstream XGEM frames"). A downstream XGEM frame is also called a subframe when appropriate.

Since the OLT 103 uses a broadcast mechanism to transmit the downstream data, the XGTC frame includes an individual downstream XGEM frame for each of the ONUs 1. In other words, an ONU 1 cannot only receive its own downstream XGEM frame, but also receive other downstream XGEM frames for other ONUs. The ONU 1 converts a format of its own downstream XGEM frame into a format of an Ethernet frame, and transmits the downstream data with the format of Ethernet frame to the computer 104. In some cases, the XGTC frame may further include one or more idle frames in addition to the downstream XGEM frames for the ONU 1. Moreover, the XGTC frame may also include a control message provided by the OLT 103, such as a bandwidth (BW) map. According to the control message, the ONU 1 generates a specific control datum, such as a Physical Layer Operation, Administration, and Maintenance upstream (PLOAMu), Dynamic Bandwidth Report upstream (DBRu), and embedded Operation Administration and Maintenance (OAM), but not limited thereto. In one embodiment, the control message may be stored (i.e., encapsulated) in the XGTC header or the downstream XGEM frame, but not limited thereto.

The header analyzer 3 is configured to obtain datum of the XGTC header from the XGTC frame, and output the XGTC payload to the filter 4 by filtering out the XGTC header.

The filter 4 is configured to filter out a downstream XGEM frame and an idle frame which do not belong to it from one or more downstream XGEM frames in the XGTC payload of the XGTC frame, and only reserve its own downstream XGEM frame (hereinafter, the "dedicated downstream XGEM frame").

The sniffer module 5 is configured to output a downstream unprocessed XGEM frame (DS SNF XGEM in FIG. 4 for example, also called a downstream unprocessed subframe when appropriate) and one or more upstream unprocessed XGEM frames (US SNF XGEM1 in FIG. 4 for example, also called an upstream unprocessed subframe when appropriate) according to the XGTC frame. Herein, the action of "output" means to transmit the downstream unprocessed XGEM frame and the upstream unprocessed XGEM frame to the frame transceiver module 6.

Figure 4:
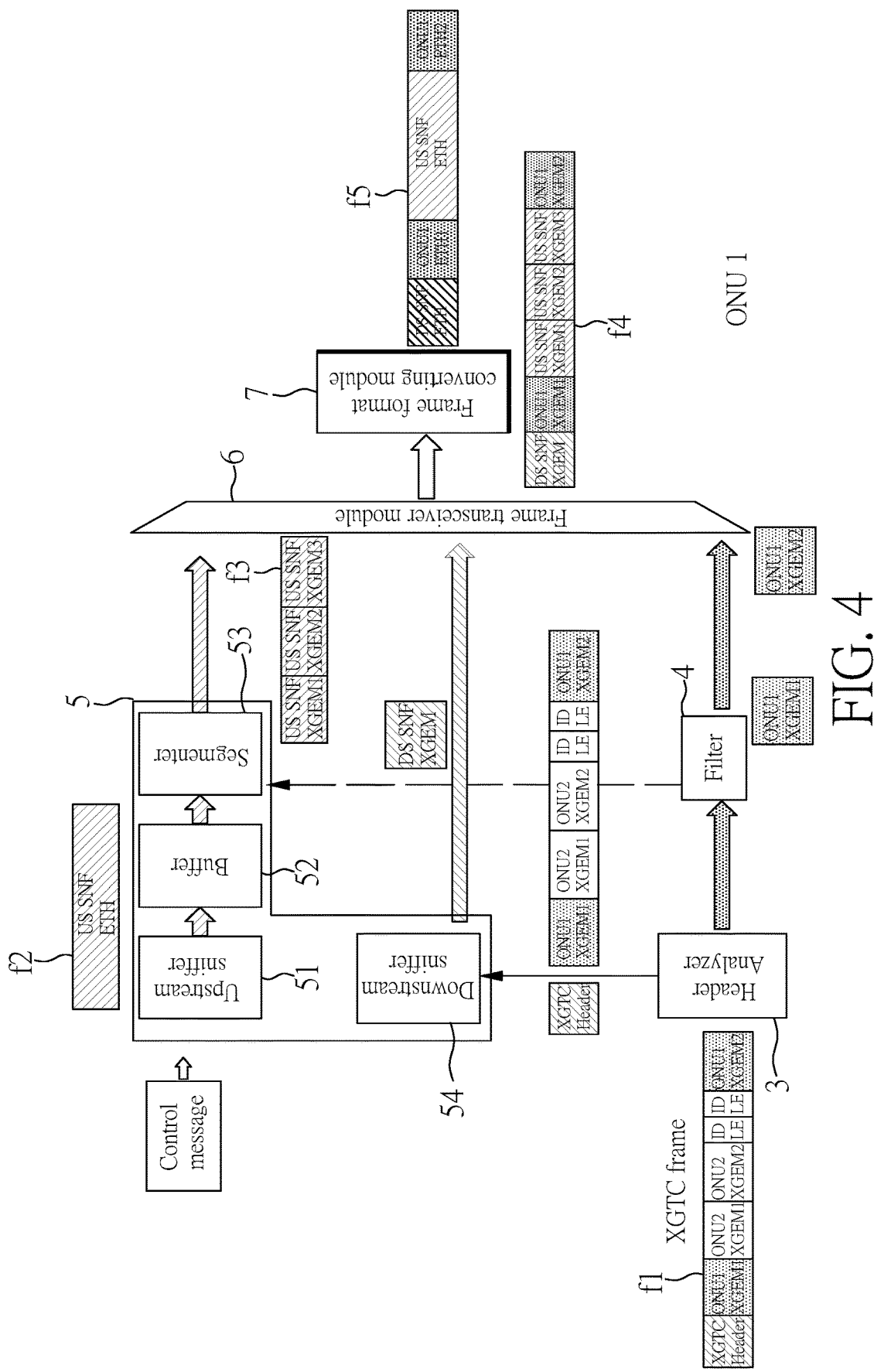
FIG. 4 shows a detailed working flowchart of the ONU according to one embodiment of the present invention.

The sniffer module 5 includes an upstream sniffer 51 (referring to FIG. 4) and a segmenter 53 (referring to FIG. 4). The upstream sniffer 51 is configured to encapsulate a specific control datum into an Ethernet (ETH) unprocessed frame (f2 in FIG. 4 for example) generated by the ONU 1 according to a control message of the XGTC frame. The segmenter 53 is configured to segment the Ethernet (ETH) unprocessed frame and convert the format of the ETH unprocessed frame to generate one or more upstream unprocessed XGEM frames (US SNF XGEM1, US SNF XGEM2, US SNF XGEM3 in FIG. 4 for example), wherein the upstream unprocessed XGEM frames may be collectively defined as an upstream unprocessed XGEM frame set (f3 in FIG. 4 for example, also called an upstream unprocessed subframe set when appropriate). Moreover, the sniffer module 5 is further configured to receive the datum of the XGTC header of the XGTC frame from the header analyzer 3, and encapsulate the datum of the XGTC header into the downstream unprocessed XGEM frame. In one embodiment, at least one of the datum of the upstream unprocessed XGEM frame and the datum of the downstream unprocessed XGEM frame is datum that needs to be analyzed and debugged.

The frame transceiver module 6 is configured to receive the dedicated downstream XGEM frame from the filter 4, and receive the upstream unprocessed XGEM frame and the downstream unprocessed XGEM frame from the sniffer module 5, and output the downstream unprocessed XGEM frame, the dedicated downstream XGEM frame and the upstream unprocessed XGEM frame, wherein the dedicated downstream XGEM frame, the upstream unprocessed XGEM frame and the downstream unprocessed XGEM frame may be collectively defined as an XGEM frame set. In one embodiment, the frame transceiver module 6 outputs the downstream unprocessed XGEM frame, the dedicated downstream XGEM frame and the upstream unprocessed XGEM frame to the frame format converting module 7 according to a temporal sequence among the downstream unprocessed XGEM frame, the dedicated downstream XGEM frame and the upstream unprocessed XGEM frame when receiving them, but not limited thereto.

The frame format converting module 7 is configured to convert a format of the XGEM frame into a format of the Ethernet frame. For example, the frame format converting module 7 is configured to receive the XGEM frame set from the frame transceiver module 6, and convert the XGEM frame set into the Ethernet frame set. That is, the downstream unprocessed XGEM frame, the dedicated downstream XGEM frame and the upstream unprocessed XGEM frame in the XGEM frame set are respectively converted into an Ethernet frame, wherein the downstream unprocessed XGEM frame is converted into a downstream unprocessed Ethernet frame, the dedicated downstream XGEM frame is converted into a dedicated downstream datum Ethernet frame, the upstream unprocessed XGEM frame is converted into an Ethernet unprocessed frame, and the downstream unprocessed Ethernet frame, the dedicated downstream datum Ethernet frame and the Ethernet unprocessed frame may be collectively defined as an Ethernet frame set. Furthermore, the frame format converting module 7 can determine that the upstream unprocessed XGEM frames (US SNF XGEM1, US SNF XGEM2, US SNF XGEM3 in FIG. 4 for example) are originated from the same Ethernet unprocessed frame f2 based on messages carried on the upstream unprocessed XGEM frames, and thereby restore the upstream unprocessed XGEM frames back to the Ethernet unprocessed frame f2.

The Ethernet interface 8 can be used to receive the Ethernet frame set from the frame format converting module 7, and can transmit the Ethernet frame set to the computer 104 via an Ethernet transmission line. In one embodiment, the computer 104 may be a personal electronic device having a processor, such as a personal computer, a notebook computer, a smart phone, a flat panel computer. In one embodiment, the computer 104 may be installed with a plug-in program used to perform an analysis and debug on data of the Ethernet frame set. In one embodiment, the plug-in program may be an analyzing tool such as Wireshark, Tcpdump, Sniffer and NetXRay, but not limited thereto. Therefore, a dedicated analyzing device is no more required.

The recording module 9 is configured to record the data obtained from the aforementioned elements, such as the control message, the specific control datum, the datum of the downstream unprocessed XGEM frame, the datum of the dedicated downstream XGEM frame and the datum of the upstream unprocessed XGEM frame. In one embodiment, each element can access data from and to the recording module 9 in a real-time way. In one embodiment, the recording module 9 may be a register, a memory, hardware, and the likes for example, but not limited thereto.

In one embodiment, the header analyzer 3, the filter 4, the sniffer module 5, the frame transceiver module 6 or the frame format converting module 7 may be an electronic circuit for example. In one embodiment, the header analyzer 3, the filter 4, the sniffer module 5, the frame transceiver module 6 or the frame format converting module 7 may be software or firmware for example, and the function of each module may be implemented by a processor in the ONU 1 for executing the software or the firmware. In one embodiment, the header analyzer 3, the filter 4, the sniffer module 5, the frame transceiver module 6 or the frame format converting module 7 may be integrated into a chip in the ONU 1. However, the present invention is not limited thereto.

Figure 3:
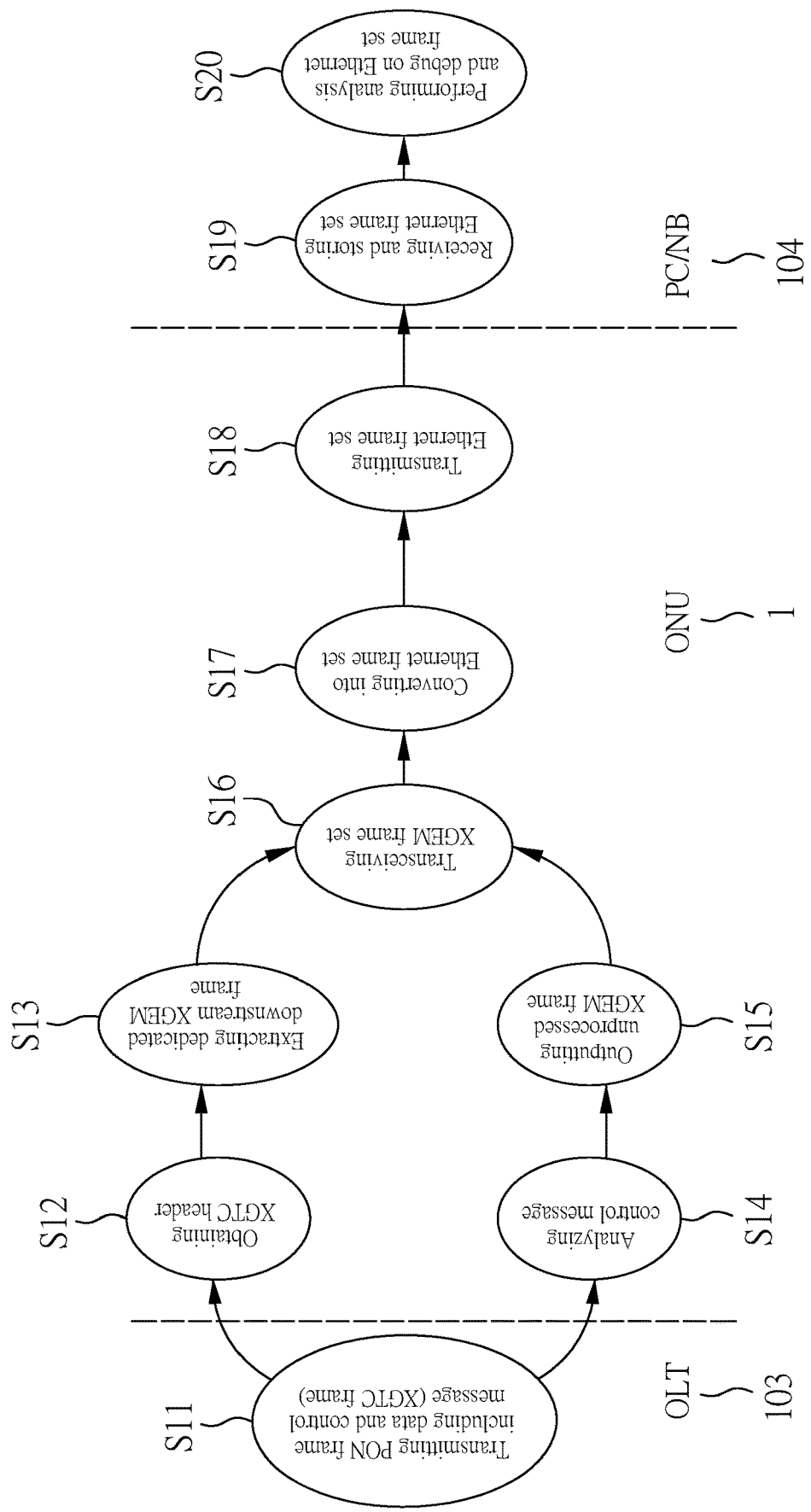
FIG. 3 shows a working flowchart of the ONU according to one embodiment of the present invention.

Next, a main workflow of the ONU 1 will be explained in the following description. FIG. 3 shows a workflow chart of the ONU 1 according to one embodiment of the present invention, with reference made also to FIG. 2.

In Step S11, the OLT 103 transmits an XGTC frame, and the ONU 1 receives the XGTC frame transmitted by the OLT 103, wherein the XGTC frame includes a plurality of downstream data in an XGTC payload and a control message in the XGTC header.

In Step S12, the ONU 1 receives the XGTC frame, the header analyzer 3 obtain datum relevant to the control message in the XGTC header from the XGTC frame. Then, in Step S13, the filter 4 extracts a dedicated downstream XGEM frame which is dedicated to the ONU 1 from the XGTC frame.

Moreover, in Step S14, after the ONU 1 receives the XGTC frame, the ONU 1 analyzes the control message, and generates a specific control datum according to the control message, and the sniffer module 5 encapsulates the specific control datum into an Ethernet unprocessed frame. Then, in Step S15, the sniffer module 5 converts the Ethernet unprocessed frame into one or more upstream unprocessed XGEM frames, and the sniffer module 5 encapsulates a datum of the XGTC header from the header analyzer 3 into a downstream unprocessed XGEM frame. Therefore, in Step S15, the sniffer module 5 outputs the unprocessed XGEM frame that needs to be analyzed and debugged, such as the one or more upstream unprocessed XGEM frames and the downstream unprocessed XGEM frame.

In Step S16, the frame transceiver module 6 outputs the downstream unprocessed XGEM frame, the dedicated downstream XGEM frame and the one or more upstream unprocessed XGEM frames to the frame format converting module 7, wherein the downstream unprocessed XGEM frame, the dedicated downstream XGEM frame and the one or more upstream unprocessed XGEM frames are collectively defined as an XGEM frame set.

In Step S17, the frame format converting module 7 can convert the XGEM frame set into an Ethernet frame set. For example, the downstream unprocessed XGEM frame in the XGEM frame set is converted into a downstream unprocessed Ethernet frame, the upstream unprocessed XGEM frame is converted into an Ethernet unprocessed frame, and the dedicated downstream XGEM frame is converted into a dedicated downstream datum Ethernet frame, wherein the downstream unprocessed Ethernet frame, the dedicated downstream datum Ethernet frame and the Ethernet unprocessed frame are collectively defined as an Ethernet frame set.

In Step S18, the Ethernet interface 8 can send the Ethernet frame set to the computer 104.

In Step S19, the computer 104 can receive the Ethernet frame set, and store the Ethernet frame set. Then, in Step S20, the computer 104 can process the dedicated datum of the ONU 1. Such processing is a common data processing in Internet of Things (IoT). A plug-in program of the computer 104 can perform analysis and debug on the datum of the downstream unprocessed Ethernet frame and the datum of the Ethernet unprocessed frame in the Ethernet frame set.

Therefore, the upstream data (such as the Ethernet unprocessed frame) and the downstream data (such as the downstream unprocessed Ethernet frame) of the ONU 1 that needs to be analyzed and debugged may be sent through an existing Ethernet device to the computer 104 that performs the analysis and debug on them, without influencing downstream data which the computer 104 itself needs to receive.

Next, an example is given to illustrate the details for how the ONU 1 processes the downstream data and the upstream data with reference to FIGS. 2, 3 and 4, wherein FIG. 4 shows a detailed working flowchart of the ONU 1 according to one embodiment of the present invention.

As shown in FIG. 4, the sniffer module 5 includes an upstream sniffer 51, a buffer 52, a segmenter 53 and a downstream sniffer 54.

Moreover, in the example of FIG. 4, an XGTC frame (labeled as f1) includes an XGTC header (labeled as XGTC Header), a first dedicated downstream XGEM frame belonging to an ONU 1 (labeled as ONU1 XGEM1), a downstream XGEM frame belonging to another ONU (labeled as ONU2 XGEM1), another dedicated downstream XGEM frame belonging to another ONU (labeled as ONU2 XGEM2), two idle frames (labeled as IDLE) and a second dedicated downstream XGEM frame belonging to the ONU 1 (labeled as ONU1 XGEM2). In one embodiment, in an actual signal transmission process, the ONU 1 receives the XGTC header (XGTC Header), the first dedicated downstream XGEM frame (ONU1 XGEM1), the downstream XGEM frame belonging to the other ONU (ONU2 XGEM1), the other downstream XGEM frame belonging to the other ONU (ONU2 XGEM2), the two idle frames (IDLE) and the second dedicated downstream XGEM frame (ONU1 XGEM2) in sequence. That is, the header and the payload of the XGTC respectively correspond to different temporal sequences. It can be understood that, the downstream XGEM frame (ONU2 XGEM1), the downstream XGEM frame (ONU2 XGEM2) belonging to the other ONU and the two idle frames (IDLE) are non-dedicated downstream XGEM frames which do not belong to the ONU 1. That is, in the example of FIG. 4, types of the non-dedicated downstream XGEM frames include the downstream XGEM frame (ONU2 XGEM1), the downstream XGEM frame (ONU2 XGEM2) and the two idle frames (IDLE).

In one embodiment, after the ONU 1 receives the XGTC frame (f1), the header analyzer 3 extracts the datum of the XGTC header (XGTC Header) of the XGTC frame (f1), and transmits the datum of the XGTC header (XGTC Header) to a downstream sniffer 54 of the sniffer module 5. Moreover, the header analyzer 3 transmits the XGTC payloads (that is, ONU1 XGEM1, ONU2 XGEM1, IDLE, IDLE, ONU1 XGEM2) of the XGTC frame (f1) to the filter 4, and the filter 4 obtains therefrom the first dedicated downstream XGEM frame (ONU1 XGEM1) and the second dedicated downstream XGEM frame (ONU1 XGEM2) for the ONU 1. Furthermore, the recording module 9 (referring to FIG. 2) can record the XGTC header of the XGTC frame (f1) and time intervals of each of the frames.

After the downstream sniffer 54 obtains the XGTC header (XGTC Header), the downstream sniffer 54 encapsulates the datum of the XGTC header (XGTC Header) into a downstream unprocessed XGEM frame (labeled as DS SNF XGEM), and transmits the downstream unprocessed XGEM frame (DS SNF XGEM) to a frame transceiver module 6.

After the filter 4 obtains the first dedicated downstream XGEM frame (ONU1 XGEM1) and the second dedicated downstream XGEM frame (ONU1 XGEM2) for the ONU 1, the filter 4 transmits the first dedicated downstream XGEM frame (ONU1 XGEM1) and the second dedicated downstream XGEM frame (ONU1 XGEM2) to the frame transceiver module 6.

The ONU 1 generates a specific control datum in response to a control message in the XGTC frame (f1), the upstream sniffer 51 of the sniffer module 5 encapsulates the specific control datum into an Ethernet unprocessed frame (labeled as f2 or US SNF ETH). Moreover, the buffer 52 temporally stores the Ethernet unprocessed frame (f2). The segmenter 53 determines whether to perform a segment processing on the Ethernet unprocessed frame (f2) according to a datum length of a single downstream XGEM in the XGTC frame (f1) (a message carrying a value of the datum length of the downstream XGEM may come from the filter 4 for example, but not limited thereto). If the segment processing is required, the segmenter 53 performs the segment processing and a format conversion to segment and convert the datum of the Ethernet unprocessed frame (f2) into a plurality of upstream unprocessed XGEM frames. If the segment processing is not required, the segmenter 53 converts the datum of the Ethernet unprocessed frame (f2) into one upstream unprocessed XGEM frame. The segmenter 3 can thereby output one or more upstream unprocessed XGEM frames, wherein the one or more upstream unprocessed XGEM frame may be collectively defined as an upstream unprocessed XGEM frame set (labeled as f3). In this case, the upstream unprocessed XGEM frame set (f3) may include a first upstream unprocessed XGEM frame (labeled as US SNF XGEM1), a second upstream unprocessed XGEM frame (labeled as US SNF XGEM2) and a third upstream unprocessed XGEM frame (labeled as US SNF XGEM3). In one embodiment, the segmenter 53 can set a datum length of a single upstream unprocessed XGEM frame, such that the datum length of a single upstream unprocessed XGEM frame corresponds to a datum length of a single downstream XGEM frame. For example, a datum length of an unprocessed XGEM frame (such as US SNF XGEM1) is set to be equal to or shorter than a datum length of downstream XGEM frame (such as ONU2 XGEM1) belonging to the other ONU, but not limited thereto. Moreover, the sniffer module 5 can transmit the upstream unprocessed XGEM frame set (f3) to the frame transceiver module 6. Furthermore, in one embodiment, the segmenter 53 transmits the upstream unprocessed XGEM frame set (f3) to the frame transceiver module 6 according to a message transmitted by the filter 4. For example, when the filter 4 filters out the downstream XGEM frame belonging to the other ONU, it obtains and transmits a beginning marker of the downstream XGEM frame belonging to the other ONU to the segmenter 53. The segmenter 53 transmits the upstream unprocessed XGEM frame set (f3) to the frame transceiver module 6 at a receiving time point of the aforementioned beginning marker.

In one embodiment, the frame transceiver module 6 receives the downstream unprocessed XGEM frame (DS SNF XGEM), the first dedicated downstream XGEM frame (ONU1 XGEM1), the upstream unprocessed XGEM frame set (f3) and the second dedicated downstream XGEM frame (ONU1 XGEM2) in sequence, wherein the downstream unprocessed XGEM frame (DS SNF XGEM), the first dedicated downstream XGEM frame (ONU1 XGEM1), the upstream unprocessed XGEM frame set (f3) and the second dedicated downstream XGEM frame (ONU1 XGEM2) may be collectively defined as an XGEM frame set (labeled as f4). The frame transceiver module 6 can transmit the XGEM frame set (f4) to the frame format converting module 7.

As shown in FIG. 4, in the temporal sequence of the XGTC frame, the XGTC header precedes the ONU1 XGEM1, the ONU1 XGEM1 precedes the ONU2 XGEM1, the ONU2 XGEM1 precedes the ONU2 XGEM2, the ONU2 XGEM2 precedes the IDLE, the IDLE precedes the other IDLE, and the other IDLE precedes the ONU1 XGEM2. Ideally, the header analyzer 3, the filter 4 and the sniffer module 5 do not change the temporal sequence. Therefore, the temporal sequence among the downstream unprocessed XGEM frame (DS SNF XGEM), the first dedicated downstream XGEM frame (ONU1 XGEM1), the upstream unprocessed XGEM frame set (f3) and the second dedicated downstream XGEM frame (ONU1 XGEM2) is the same as a temporal sequence configuration as in the XGTC frame.

The time interval of the downstream unprocessed XGEM frame (DS SNF XGEM) may correspond to the time interval of the XGTC header of the XGTC frame (f1). That is, the downstream unprocessed XGEM frame (DS SNF XGEM) locates in a first time interval of the XGEM frame set (f4); in one embodiment, the datum length of the downstream unprocessed XGEM frame (DS SNF XGEM) may be equal to the datum length of the XGTC header, but not limited thereto.

The time interval of the first dedicated downstream XGEM frame (ONU1 XGEM1) in the XGEM frame set (f4) may correspond to the time interval of the first dedicated downstream XGEM frame (ONU1 XGEM1) of the XGTC frame (f1). That is, the first dedicated downstream XGEM frame (ONU1 XGEM1) in the XGEM frame set (f4) may locate in the time interval after the downstream unprocessed XGEM frame (DS SNF XGEM). In other words, the time interval of the first dedicated downstream XGEM frame (ONU1 XGEM1) in the XGEM frame set (f4) may be equal to the time interval of the first dedicated downstream XGEM frame (ONU1 XGEM1) of the XGTC frame (f1).

The time interval of each of the first upstream unprocessed XGEM frame (US SNF XGEM1), the second upstream unprocessed XGEM frame (US SNF XGEM2) and the third upstream unprocessed XGEM frame (US SNF XGEM3) may correspond to the time interval of each of the downstream XGEM frame (such as ONU2 XGEM1, ONU2 XGEM2) for the other ONU in the XGTC frame (f1) and the idle frame (IDLE). That is, the first upstream unprocessed XGEM frame (US SNF XGEM1), the second upstream unprocessed XGEM frame (US SNF XGEM2) and the third upstream unprocessed XGEM frame (US SNF XGEM3) may locate in the time interval after the first dedicated downstream XGEM frame (ONU1 XGEM1). It can be understood that, the temporal sequence between the downstream unprocessed XGEM frame (DS SNF XGEM) and the first upstream unprocessed XGEM frame (US SNF XGEM1), the second upstream unprocessed XGEM frame (US SNF XGEM2) and the third upstream unprocessed XGEM frame (US SNF XGEM3) is the same as the temporal sequence between the XGTC header and the non-dedicated downstream XGEM frames of the XGTC payload.

The time interval of the second dedicated downstream XGEM frame (ONU1 XGEM2) in the XGEM frame set (f4) may correspond to the time interval of the second dedicated downstream XGEM frame (ONU1 XGEM2) of the XGTC frame (f1), That is, the second dedicated downstream XGEM frame (ONU1 XGEM2) in the XGEM frame set (f4) may locate in the time interval after the third upstream unprocessed XGEM frame (US SNF XGEM3). In other words, the time interval of the second dedicated downstream XGEM frame (ONU1 XGEM2) in the XGEM frame set (f4) may be equal to the time interval of the second dedicated downstream XGEM frame (ONU1 XGEM2) of the XGTC frame (f1).

It should be noted that, in other embodiments, assuming that there are a great number of the upstream unprocessed XGEM frames, and accordingly an overall datum length of all of the upstream unprocessed XGEM frames extends beyond the time interval between the first dedicated downstream XGEM frame (ONU1 XGEM1) and the second dedicated downstream XGEM frame (ONU1 XGEM2) in the XGEM frame set (f4), and then, some of the upstream unprocessed XGEM frames may be distributed later than the second dedicated downstream XGEM frame (ONU1 XGEM2), but not limited thereto.

In one embodiment, the frame format converting module 7 obtains the XGEM frame set (f4), and can convert the XGEM frame set (f4) into an Ethernet frame set (labeled as f5). In the example of FIG. 4, the Ethernet frame set (f5) may include a downstream unprocessed Ethernet frame (labeled as DS SNF ETH), a first dedicated downstream data Ethernet frame (labeled as ONU1 ETH1), an Ethernet unprocessed frame (US SNF ETH) and a second dedicated downstream data Ethernet frame (labeled as ONU1 ETH2). The Ethernet unprocessed frame (US SNF ETH) is formed based on the first upstream unprocessed XGEM frame (US SNF XGEM1), the second upstream unprocessed XGEM frame (US SNF XGEM2) and the third upstream unprocessed XGEM frame (US SNF XGEM3). Therefore, the Ethernet frame set includes a plurality of Ethernet frames, wherein the downstream unprocessed Ethernet frame (DS SNF ETH) may be defined as a first Ethernet frame, the Ethernet unprocessed frame (US SNF ETH) may be defined as a second Ethernet frame, the first dedicated downstream data Ethernet frame (ONU1 ETH1) may be defined as a third Ethernet frame, and the second dedicated downstream data Ethernet frame (ONU1 ETH2) may be defined as a fourth Ethernet frame.

Accordingly, general data (such as ONU1 ETH1, ONU1 ETH2), downstream data (such as DS SNF ETH) and upstream data (such as US SNF ETH) that needs to be analyzed and debugged for the ONU 1 all can be transmitted to the computer 104 via an existing Ethernet interface for the ONU 1, and processed by the computer 104. Moreover, a plug-in program in the computer 104 can perform analysis on the downstream data and the upstream data.

In conclusion, the present invention provides an improved ONU, which can transmit data that needs to be analyzed and debugged to a computer for further analysis and debug via an existing Ethernet interface, without using a dedicated analyzing device, and therefore it can significantly reduce costs.

While an XGPON protocol is taken as an example in the above embodiments, the present invention is applicable to any passive optical network protocols. The passive optical networks may be a GPON, a ten (10)-gigabit-capable symmetric passive optical network (hereinafter, XGSPON), or a next-generation passive optical network 2 (hereinafter, NG-PON2).

Mappings of the specific specification from the above XGPON embodiments to each of GPON, XGSPON, and NG-PON2 are shown in Table 1.

TABLE 1

| Protocol | 1st specific specification | 2nd specific specification | 3rd specific specification |
|---|---|---|---|
| XGPON | XGTC (frame) | XGTC header | XGEM |
| GPON | GTC (frame) | GTC header | GEM |
| XGSPON | framing sublayer (hereinafter, FS) frame | FS header | XGEM |
| NGPON2 | FS frame | FS header | XGEM |

When the present invention is applied to a network system adopting a GPON protocol, XGTC frame, XGTC header, and XGEM are replaced with GTC frame, GTC header, and GEM, respectively.

When the present invention is applied to a network system adopting a XGSPON protocol, XGTC frame, XGTC header, and XGEM are replaced with FS frame, FS header, and XGEM, respectively.

When the present invention is applied to a network system adopting a NGPON2 protocol, XGTC frame, XGTC header, and XGEM are replaced with FS frame, FS header, and XGEM, respectively.

Although the present invention has been explained in relation to its preferred embodiment, it is to be understood that many other possible modifications and variations can be made without departing from the spirit and scope of the invention as hereinafter claimed.

What is claimed is:

1. An optical network unit (ONU), applicable to a passive optical network (PON), the ONU comprising:
    an optical fiber interface configured to receive an XGPON Transmission Convergence (XGTC) frame, wherein the XGTC frame comprises an XGTC header and a plurality of downstream XGPON Encapsulation Method (XGEM) frames;
    a filter configured to obtain a dedicated downstream XGEM frame which belongs to the ONU from the XGTC frame,
    a sniffer module configured to output a downstream unprocessed XGEM frame and an upstream unprocessed XGEM frame according to the XGTC frame; and
    a frame format converting module configured to convert the downstream unprocessed XGEM frame and the upstream unprocessed XGEM frame respectively into a first Ethernet frame and a second Ethernet frame;
    wherein the frame format converting module is configured to convert the dedicated downstream XGEM frame into a third Ethernet frame, wherein the plurality of downstream XGEM frames comprise the dedicated downstream XGEM frame and a non-dedicated downstream XGEM frame which does not belong to the ONU.

2. The optical network unit of claim 1, wherein the sniffer module comprises an upstream sniffer and a segmenter, the upstream sniffer is configured to encapsulate a specific control datum into an Ethernet unprocessed frame, and the segmenter is configured to convert the Ethernet unprocessed frame into the upstream unprocessed XGEM frame, wherein the specific control datum is generated according to a control message in the XGTC frame.

3. The optical network unit of claim 2, wherein the sniffer module comprises:
    a downstream sniffer configured to encapsulate datum of the XGTC header into the downstream unprocessed XGEM frame.

4. The optical network unit of claim 3, further comprising:
    a header analyzer configured to obtain datum of the XGTC header from the XGTC frame.

5. The optical network unit of claim 2, wherein the segmenter is configured to set a datum length of the upstream unprocessed XGEM frame to be equal to a datum length of the non-dedicated downstream XGEM frame.

6. The optical network unit of claim 1, wherein the XGTC frame further comprises an XGTC payload, and the XGTC payload comprises the plurality of downstream XGEM frames, wherein a temporal sequence between the downstream unprocessed XGEM frame and the upstream unprocessed XGEM frame is the same as a temporal sequence between the XGTC header and the XGTC payload.

7. The optical network unit of claim 6, further comprising:
    a recording module, configured to record the XGTC header in the XGTC frame and data of the downstream XGEM frames.

8. The optical network unit of claim 1, further comprising:
    an Ethernet interface configured to send the first Ethernet frame and the second Ethernet frame to a computer.

9. The optical network unit of claim 8, wherein the computer is installed with a plug-in program used to perform an analysis and debug on the first Ethernet frame and the second Ethernet frame.

10. An optical network unit (ONU), comprising:
    an optical fiber interface configured to receive a downstream frame, wherein the downstream frame comprises a header and a plurality of subframes;
    a sniffer module configured to output a downstream unprocessed subframe and an upstream unprocessed subframe set according to the downstream frame, wherein the sniffer module further comprises a segmenter configured to output the upstream unprocessed subframe set according to a beginning marker of a first subframe of the subframes, the first subframe belonging to a first ONU other than the ONU; and
    a frame format converting module configured to convert the downstream unprocessed subframe and the upstream unprocessed subframe set respectively into a first Ethernet frame and a second Ethernet frame.

11. The optical network unit of claim 10, wherein the segmenter is configured to output the upstream unprocessed subframe set at a receiving time point of the beginning marker.

* * * * *